United States Patent
Fujioka et al.

[11] Patent Number: 6,007,254
[45] Date of Patent: Dec. 28, 1999

[54] NEEDLE ROLLER BEARING

[75] Inventors: Norio Fujioka, Shizuoka-ken; Masuhisa Yoshida, Iwata, both of Japan

[73] Assignee: NTN Corporation, Osaka-fu, Japan

[21] Appl. No.: 09/157,375

[22] Filed: Sep. 21, 1998

[30] Foreign Application Priority Data

| Sep. 29, 1997 | [JP] | Japan | 9-264373 |
| Sep. 29, 1997 | [JP] | Japan | 9-264374 |
| Sep. 29, 1997 | [JP] | Japan | 9-264375 |

[51] Int. Cl.$^6$ ............ F16C 33/46; F16C 33/54
[52] U.S. Cl. ............ 384/572; 384/575; 384/580
[58] Field of Search ............ 384/572, 575, 384/576, 577, 578, 579, 580, 470

[56] References Cited

U.S. PATENT DOCUMENTS

| 3,298,761 | 1/1967 | Schaeffler | 384/572 |
| 3,305,279 | 2/1967 | Zimmerer | 384/580 X |
| 3,582,165 | 6/1971 | Koch | 384/580 |
| 5,584,583 | 12/1996 | Hidano | 384/470 |

*Primary Examiner*—Thomas R. Hannon
*Attorney, Agent, or Firm*—Nikaido, Marmelstein, Murray & Oram LLP

[57] ABSTRACT

The needle roller bearing A comprises a cage 3 having a plurality of long window-shaped pockets 3a formed at an appointed interval on its circumference, and a plurality of needle rollers 4 rollably accommodated and retained in the pockets 3a of the cage 3. The connection radius R (radius of curvature) between the inner diameter side portion of the pocket wall surface 3a1 and the inside surface 3b1 of the annular portion 3b, and the connection radius R (radius of curvature) between the inner diameter side portion of the pocket wall surface 3a2 and the inside surface 3b1 of the annular portion 3b of the cage 3 are set to a value having a relationship of $0.2 < R/Dr \leq 0.5$, preferably $0.3 \leq R/Dr \leq 0.5$ with respect to the diameter Dr of the needle roller 4.

12 Claims, 4 Drawing Sheets

NEEDLE ROLLER BEARING

BACKGROUND OF THE INVENTION

The present invention relates to a needle roller bearing and a supporting structure of a connecting rod using the same.

For example, in a small-sized two-cycle engine for a motor cycle, there are many cases where a needle roller bearing having no bearing ring, in which a cage and a plurality of needle rollers are assembled, is used at fitting portion between a major boss portion of a connecting rod and a crank pin and at fitting portion between a minor boss portion of a connecting rod and a piston pin. This is because the size and weight of the engine are attempted to be decreased by utilizing the advantages of this type of needle roller bearing, in that the needle roller bearing is light and has a lower sectional height and a greater load capacity.

FIG. 4 shows a conventional needle roller bearing B used to support a connecting rod. The needle roller bearing B comprises a cage 13 in which a plurality of long window-shaped pockets 13a are formed at an appointed interval on the circumference, and a plurality of needle rollers 14 which are rollably accommodated and retained in the respective pockets 13a of the cage 13.

The cage 13 is an annular body in which both sides of the pockets 13a in the axial direction are annular portions 13b and both sides of each of the pockets 13a in the circumferential direction are bar portions 13c continuous to the annular portions 13b. The middle portion 13c1 of the bar portion 13c in the axial direction is recessed so that it has a smaller diameter than both-side portions 13c2 thereof in the axial direction, and the middle portion 13c1 is made continuous to the both-side portions 13c2 via inclined portions 13c3. Furthermore, the annular portions 13b protrudes toward the inner diameter side like flanges so that they have smaller diameter than both-side portions 13c2 of the bar portions 13c. Therefore, the longitudinally sectional view of the cage 13 including the bar portion 13c is made roughly M-shaped as the entirety.

The cage 13 of such a needle roller bearing B as described above is produced in such a manner that, after the roughly M-shaped basic form shown in the same drawing is obtained by lathing a steel pipe material or the like, the pockets 13a are punched out by pressing. However, conventionally, taking the performance into consideration when punching out the pockets, a connection radius R' (which is formed when securing the roughly M-shaped basic form by lathing) with the annular portion 13b, which is shown in enlargement in FIG. 4(b) is set to as a small value as possible (that is, is set to R'/Dr≦0.2 where the diameter of the needle roller 14 is Dr).

Although setting the connection radius R' to a small value improves the punching-out performance of the pockets 13a, this becomes disadvantageous in view of the contact surface pressure at a contact portion with the end surface of the needle rollers 14 because the dimension Y3 in the radius direction (and an area Y4 which is brought into contact with the end surface of the needle rollers 14) of a pocket wall surface 13a1 at the annular portion 13b side of the pocket 13a is made small. Furthermore, the connection radius R' being small becomes to be disadvantageous in view of the strength of the connection part (stress concentration) between both-side portions 13c2 of the bar portion 13c and the annular portion 13b. On the other hand, these factors regarding the durability and strength of the cage 13 can be eliminated by thickening both-side portions 13c2 of the bar portion 13c. However, this results in an increase of the weight of the cage 13 to cause the advantages of this type of needle roller bearing to be decreased.

Furthermore, since in the conventional needle roller bearing B the inside surface 13b1 of the flange-like protruding portion of the annular portion 13b of the cage 13 is formed on a plane parallel to the radius direction. Therefore, since the cutting resistance is large, the machining must be carried out with the feedrate of a cutting tool slowed down.

This type of needle roller bearing is lubricated with a lubricant oil included in a fuel-air mixture of gasoline and lubricant oil, which are sent into a crank chamber or a cylinder chamber, and is operated in an environment where contamination (worn particles of the piston, etc.) is liable to enter the bearing. Therefore, by setting the inner diameter D1' of the annular portion 13b of the cage 13 to a larger value by an appointed degree than the inscribed circle diameter D0 of needle rollers 14, thereby forming an annular clearance S' between the inner circumferential surface of the annular portion 13b and the outer circumferential surface of its counterpart component (crank pin or piston pin), circulation of the lubricant oil into the bearing and discharge of contamination from the inside of the bearing are secured. Conventionally, the inner diameter D1' of the annular portion 13b of the cage 13 is set to a value having the relationship of (D0+0.15Dr)≦D1≦(D0+0.20Dr) with respect to the inscribed circle diameter D0 of the needle rollers 14 and the diameter Dr of the needle rollers 14 (that is, equivalent to the inner diameter of the middle portion 13b1 of the bar portion 13c). However, recently, in line with the tendency of downsizing, lightening, and increasing the revolution speed and output of an engine, there are many cases where this type of needle roller bearing is used in an environment where a shortage of lubricant oil arises and contamination is liable to be accumulated. Therefore, it is requested that the lubrication performance and discharge performance of contamination are further improved.

SUMMARY OF THE INVENTION

It is therefore an object of the invention to increase the durability and strength of a needle roller bearing, in particular to improve the durability and strength of its cage, and to further improve the lubrication performance and discharge performance of contamination and to improve the machining performance while maintaining the advantages of this type of needle roller bearing, in line with the tendency of downsizing, lightening, increasing the revolution speed and output of an engine.

In order to achieve the abovementioned objects, the invention is to provide a structure in which the connection radius R (radius of curvature) between the inner diameter side portion of the wall surface of the pocket of the cage and the annular portion is set to a value having a relationship of 0.2<R/Dr≦0.5 with respect to the diameter Dr of needle roller. By setting the connection radius R in a range of 0.2<R/Dr≦0.5, preferably 0.3<R/Dr≦0.5, it is possible to secure greater dimension in the radius direction of the pocket wall surface at the annular portion side of the pocket than in the conventional cage <R'/Dr≦0.2, R'<R). Therefore, the contact surface pressure at the contacting portion with the end surface of the needle roller is decreased to cause the durability of the cage to be improved. Furthermore, since the connection radius R is increased, the stress concentration at the connection portion between the bar portion and the annular portion is lightened to cause the strength of the cage to be increased. Still furthermore, since contamination is hardly accumulated at the connection portion between the bar portion and the annular portion, contamination discharge can be made easier.

If R/Dr is less than 0.2, the abovementioned effects intended by the invention can not be obtained. To the contrary, if R/Dr is more than 0.5, the punching-out efficiency of the pockets is remarkably lowered. Therefore, in view of a lowering of the contact surface pressure, improvement of the strength of the cage, and machining efficiency of pockets, it is best that the connection radius R is set in a range of $0.2 < R/Dr \leq 0.5$, and preferably $0.3 \leq R/Dr \leq 0.5$.

Furthermore, the present invention provides a structure in which the inside surface of the portion protruding toward the inner diameter side of the annular portion of the cage is inclined inwardly of the bearing toward the outer diameter surface. By causing the inside surface of the annular portion to be inclined in this direction, greater dimension in the radius direction of the pocket wall surface at the annular portion side of the pocket can be taken in comparison with the conventional cage. Therefore, the contact surface pressure at the contacting portion with the end surface of the needle roller is decreased to improve the durability of the cage. Furthermore, since the inclination angle of the inside surface of the annular portion becomes a relief angle in cutting, the cutting resistance is decreased to improve the machining efficiency. Furthermore, since the inside surface of the annular portion is inclined in the abovementioned direction, a lead-in effect of lubricant oil can be obtained by a centrifugal force when running the bearing, and the lubricant oil is easily circulated into the interior of the bearing along the inside surface of the annular portion.

Furthermore, the invention provides a structure in which the inner diameter D1 of the annular portion of the cage is set to a value having a relationship of $(D0+0.35Dr) \leq D1 \leq (D0+0.45Dr)$ with respect to the inscribed circle diameter D0 of needle rollers and diameter Dr of the needle roller. By this structure, since the clearance between the inner circumferential surface of the annular portion of the cage and the outer circumferential surface of the counterpart member is further enlarged in comparison with the conventional examples, circulation of lubricant oil and discharge of contamination are further improved.

If D1 is less than (D0+0.35Dr), the abovementioned effects intended by the invention can not be obtained. To the contrary, if the D1 is more than (D0+45Dr), it is not preferable since the rigidity of the cage is lowered. Therefore, in view of improvement in the circulation of lubricant oil and in discharge of contamination, and securing of the rigidity of the cage, it is best the inner diameter D1 of the annular portion is set in a range of $(D0+0.35Dr) \leq D1 \leq (D0+0.45Dr)$.

According to the invention, it is possible to improve the durability, strength, and discharge performance of contamination of a needle roller bearing while maintaining the advantages of this type of needle roller bearing, which are light in weight, low in sectional height, and great in load capacity. In particular, it is possible to secure high durability and high reliability as a supporting bearing of a connecting rod of an engine.

The supporting structure of a connecting rod according to the invention, in which a needle roller bearing as described above is used, is compact and excellent in durability. It contributes to further downsizing of an engine, lightening of the weight thereof, and achievement in high speed revolutions and high output thereof.

DESCRIPTION OF PREFERRED EMBODIMENTS

Hereinafter, a description is given of preferred embodiments.

Figure 1:
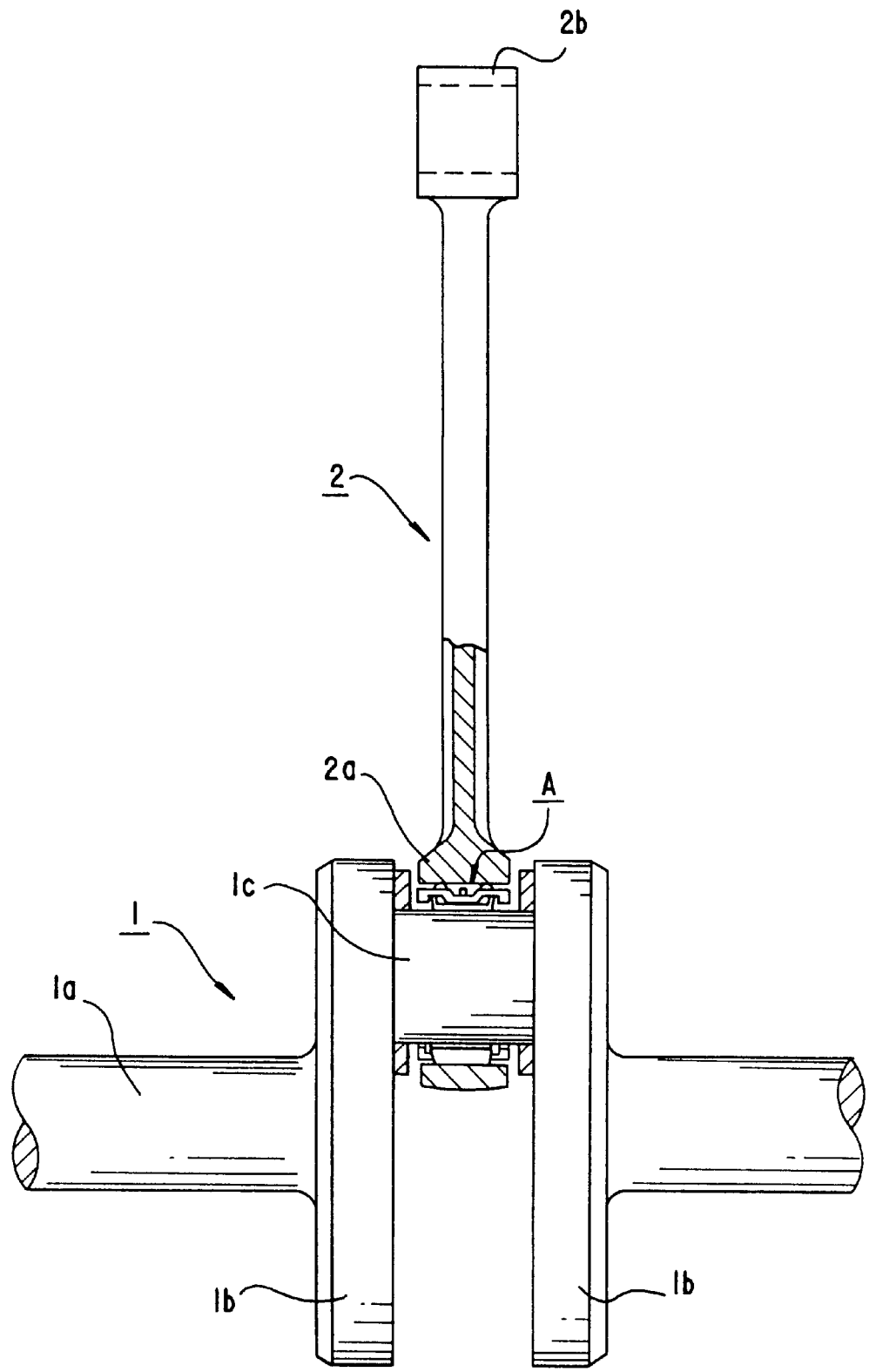
FIG. 1 is a view showing one example of a supporting structure of the connecting rod of an engine.

FIG. 1 shows a crank shaft 1 and a connecting rod 2 of an engine. The crank shaft 1 is disposed inside a crank chamber (not illustrated), and comprises a rotation centering axis 1*a*, balance weights 1*b*, and a crank pin 1*c*. There is a case where the crank pin 1*c* is formed integral with the balance weights 1*b* or where the crank pin 1*c* is formed as a separate member. The connecting rod 2 is provided with a major boss portion 2*a* at one end thereof and a minor boss portion 2*b* at the other end thereof. The major boss portion 2*a* is fitted to the crank pin 1*c* via a needle roller bearing A as described below. Furthermore, the minor boss portion 2*b* of the connecting rod 2 is fitted to the piston pin of a piston (not illustrated) via a bearing. As the bearing to support the minor boss portion 2*b*, a needle roller bearing as described below may be used.

A fuel-air mixture of gasoline and lubricant oil is sent into the crank chamber and is introduced into a combustion chamber of a cylinder in line with the vertical movements of the cylinder wherein combustion is carried out. And the piston is vertically actuated by the combustion force of the fuel-air mixture in the cylinder chamber, wherein the vertical movement of the piston is converted to rotating motions of the rotation center shaft 1*a* by the connecting rod 2 and crank pin 1*c* to cause the engine to rotate. The needle roller bearing A (and a bearing intervening between the inner circumferential surface of the minor boss portion 2*b* of the connecting rod 2 and the outer circumferential surface of the piston pin of the piston) takes the role of smoothly guiding the movement of the connecting rod 2, which is caused to occur in line with the vertical motions of the piston and the eccentric rotation motions of the crank pin 1*c*.

Figure 2A:
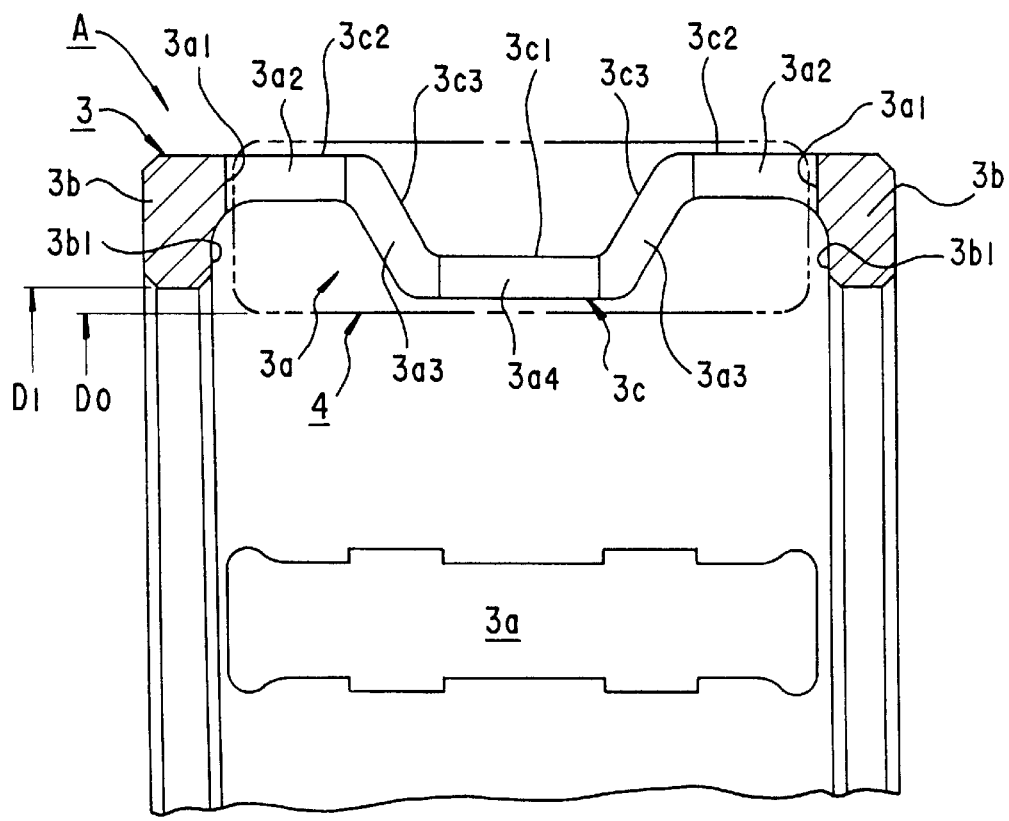
FIGS. 2(*a*) and 2(*b*) are partially cross-sectional views of a needle roller bearing A according to a preferred embodiment.

FIGS. 2(*a*) and (*b*) show the needle roller bearing A according to the embodiment, which intervenes between the inner circumferential surface of the major boss portion 2*a* of the connecting rod 2 and the outer circumferential surface of the crank pin 1*c*. The needle roller bearing A comprises a cage 3 having a plurality of long window-shaped pockets 3*a* formed at an appointed interval on its circumference, and a plurality of needle rollers 4 rollably accommodated and retained in the pockets 3*a* of the cage 3.

The cage 3 is an annular body in which both-side portions of the pockets 3*a* in the axial direction are annular portions 3*b* and both-side portions of each of the pockets 3*a* in the circumferential direction are bar portions 3*c* continuous to the annular portions 3*b* (in a case where the crank pin 1*c* is formed integral with the balance weights 1*b*, there is a case where the cage is of a two-split structure in order to enable its attachment). The middle portion 3*c*1 of the bar portion 3*c* in the axial direction is recessed so that the diameter thereof is smaller than that of both-side portions 3*c*2, and is continuous to the both-side portions 3*c*2 via inclined portions 3*c*3. Furthermore, the annular portions 3*b* protrudes to be like flanges toward the inner diameter side so that it has a smaller diameter than in the both-side portions 3*c*2 of the bar portion 3c. Therefore, the longitudinally sectional view of the cage 3 including the bar portion 3c forms a roughly M-shaped profile.

Figure 2B:
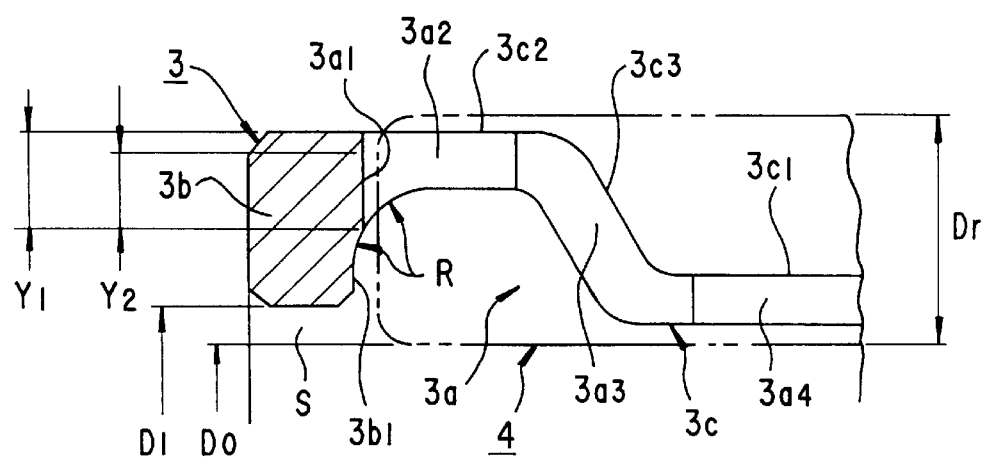

Pocket wall surfaces 3a1 which are brought into contact with the end surfaces of the needle rollers 4 are formed inside (that is, the pocket side) of the annular portions 3b. As shown in FIG. 2(b), the dimension of the pocket wall surface 3a1 in the radius direction is Y1, in which the area brought into contact with the end surface of the needle roller 4 is Y2. The inner diameter side portion of the pocket wall surface 3a1 is continuous to the inside surface 3b1 of the annular portion 3b via the connection radius R.

Pocket wall surfaces 3a2 for preventing rollers from detaching to the outer diameter side are formed inside (that is, the pocket side) of the both-side portions 3c2 of the bar portion 3c. As shown in FIG. 2(b), the inner diameter side portion at one end of the pocket wall surface 3a2 is continuous to the inside surface 3b1 of the annular portion 3b via the connection radius R (which is of the same size as the connection radius R of the pocket wall surface 3a1). Furthermore, pocket wall surfaces 3a3 which are brought into contact with rolling surface of the needle roller 4 on pitch circle (pitch circle of the needle rollers) are formed inside of the inclined portion 3c3 of the bar portion 3c, and pocket wall surface 3a4 for preventing the needle roller 4 from falling down to the inner diameter side is formed inside of the middle portion 3c1 of the bar portion 3c. Furthermore, the thickness of the bar portion 3C is the same as that of the conventional cage.

In the preferred embodiment, the connection radius R (radius of curvature) between the inner diameter side portion of the pocket wall surface 3a1 and the inside surface 3b1 of the annular portion 3b, and the connection radius R (radius of curvature) between the inner diameter side portion of the pocket wall surface 3a2 and the inside surface 3b1 of the annular portion 3b of the cage 3 are set to a value having a relationship of $0.2 < R/Dr \leq 0.5$, preferably $0.3 \leq R/Dr \leq 0.5$ with respect to the diameter Dr of the needle roller 4. As a more preferable value of (R/Dr), (R/Dr=3.2) and a value (±0.5 or less centering around 3.2) in the vicinity thereof are exemplarily expressed.

The cage 3 is produced in such a manner that, after a roughly M-shaped basic form shown in the same drawing is obtained by lathing a steel pipe material or the like (at that time, a connection radius R is also formed), the pockets 3a are punched out by pressing. Since the connection radius R is set to the abovementioned value (that is, R>R' with respect the conventional connection radius R'), the radius direction dimension Y1 (and the contacting area Y2 with the end surface of the needle rollers 4) of the pocket wall surface 3a1 formed by the punching-out process is made greater than those in the conventional cage. Therefore, the contact surface pressure at the contacting area Y2 between the pocket wall surface 3a1 and the end surface of needle roller 4 is further decreased than in the conventional examples. Thereby, the durability of the cage 3 is increased. Furthermore, since the stress concentration onto the connection portion between each of the both-side portions 3c2 of the bar portion 3c and the annular portion 3b is lightened by an increase of the connection radius R, the strength of the cage 3 is increased. Still furthermore, since contamination is hardly accumulated at the abovementioned connection portion, the discharge performance of the contamination is improved.

Although the inner diameter D1 of the annular portion 3b may be equal to the inner diameter of the middle portion 3c1 of the bar portion 3c {for example, the inscribed circle diameter D0 of the needle rollers 4+(needle roller diameter Dr×0.15 through 0.2)}, in this preferred embodiment, in order to secure smooth circulation of lubricant oil into the bearing and to improve discharge performance of contamination from inside the bearing, the inner diameter dimension D1 is set to a value in a range of $(D0+0.35Dr) \leq D1 \leq (D0+0.45Dr)$. The annular clearance S formed between the inner circumferencial surface of the annular portion 3b and the outer circumferential surface of the crank pin 1c is further enlarged than in the prior art construction (S>S'), so that the circulation of lubricant oil and discharge of contamination are further improved.

Figure 3A:
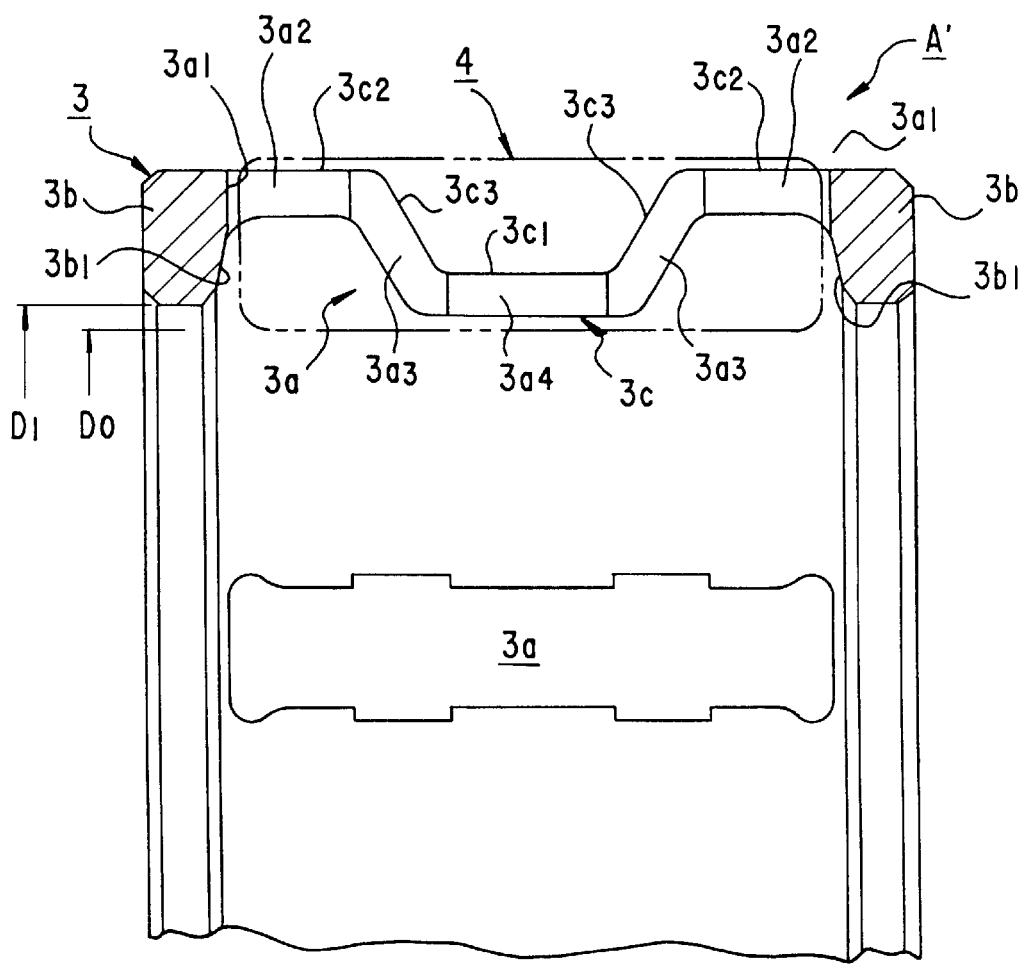
FIGS. 3(*a*) and 3(*b*) are partially cross-sectional views of a needle roller bearing A' according to another preferred embodiment.
Figure 3B:
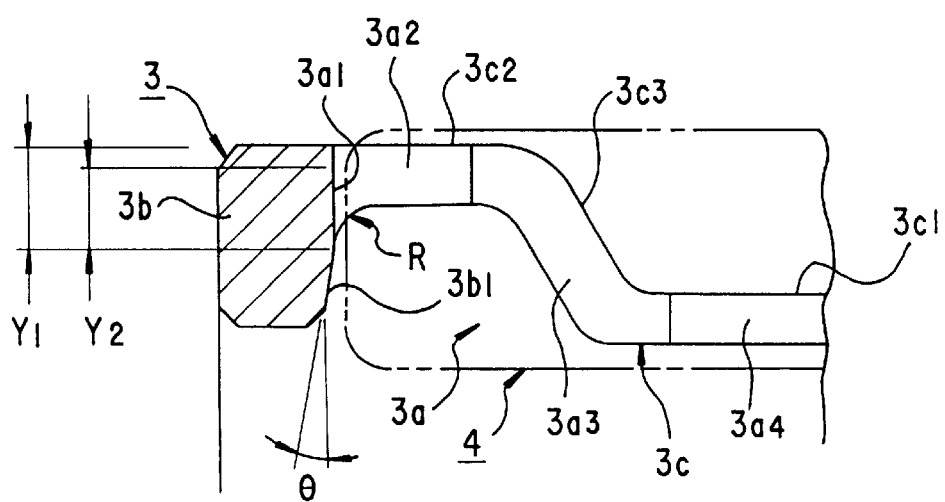
Figure 4A:
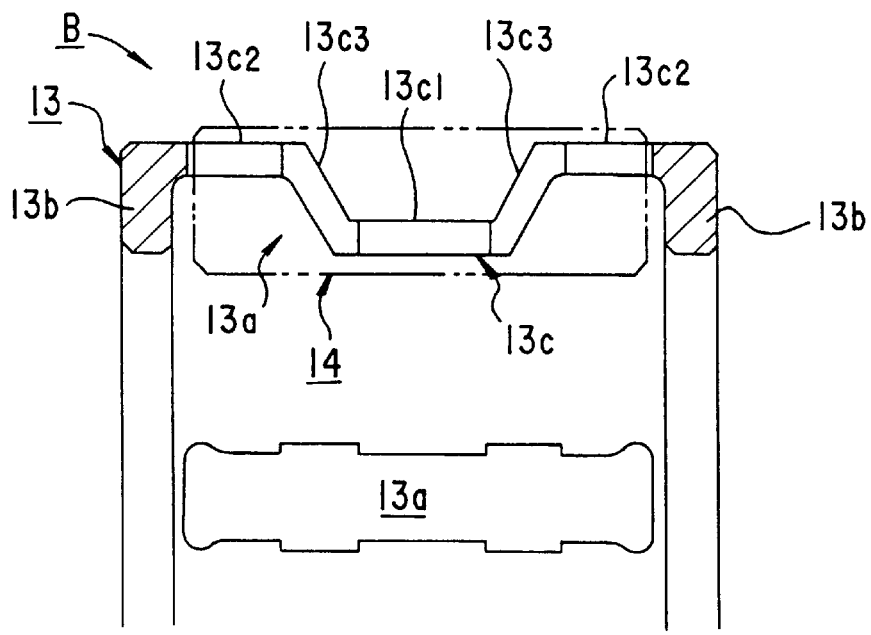
FIGS. 4(*a*) and 4(*b*) are partially cross-sectional views of a conventional needle roller bearing B.
Figure 4B:
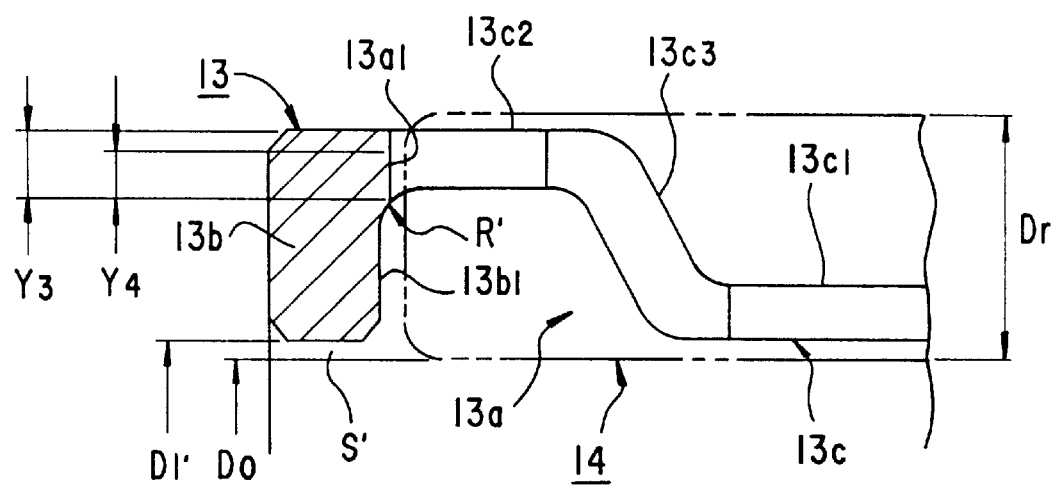

FIGS. 3(a) and (b) show a needle roller bearing A' according to another preferred embodiment of the invention. As shown in enlargement in FIG. 3(b), pocket wall surface 3a1 contact with the end surface of the needle roller 4, and inside surface 3b1 inclined by inclination angle θ inwardly of the bearing toward the outer diameter side are formed inside (that is, the pocket side) the annular portion 3b. The dimension of the pocket wall surface 3a1 in the radius direction is Y1, wherein the area brought into contact with the end surface of the needle roller 4 is Y2. The inside surface 3b1 is formed inside the portion protruding like a flange of the annular portion 3b and is continuous to the pocket wall surface 3a1 in the outer diameter side. It is preferable that the inclination angle θ of the inside surface 3b1 is set to a value in a range from not less than 10° to not more than 20°.

The cage 3 is produced in such a manner that, after a roughly M-shaped basic form shown in the same drawing is obtained by lathing a steel pipe material or the like (at that time, a connection radius R is also formed), the pockets 3a are punched out by pressing. At that time when punching out the pockets 3a, since the inside surface 3b1 is shaped so as to be inclined inwardly of the bearing, the radius direction dimension Y1 (and the contact area Y2 with the end surface of the needle rollers 4) of the pocket wall surface 3a1 formed by a punching-out process is made greater than those in the prior arts. Therefore, the contact surface pressure at the contact area Y2 between the pocket wall surface 3a1 and the end surface of the needle roller 4 is further decreased than in prior arts. Therefore, the durability of cage 3 is improved. Furthermore, since the inclination angle θ becomes a relief angle for cutting the inside surface 3b1, the cutting resistance is decreased, and the cutting performance is improved. Still furthermore, since the inside surface 3b1 has an inclination angle θ, a lead-in effect of lubricant oil can be obtained by a centrifugal force when running the bearing, wherein the lubricant oil is likely to flow in the interior of a bearing along the inside surface 3b1. Since all other construction complies with the abovementioned preferred embodiment, the description thereof is omitted.

What is claimed is:

1. A needle roller bearing comprising:
    a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof; and
    a plurality of needle rollers retained in the pockets of the cage, wherein a connection radius R (radius of curvature) between an inner diameter side portion of a wall of the pocket and the annular portion has a relationship of $0.2<R/Dr\leq0.5$ with respect to the diameter Dr of the needle roller.

2. A needle roller bearing as set forth in claim 1, wherein the needle roller bearing is used to support a connecting rod of an engine.

3. A cage for a needle roller bearing comprising:

pockets for retaining needle rollers formed at a plurality of portions in the circumferential direction thereof;

annular portions at both sides in the axial direction of the pockets; and bar portions at both sides in the circumferential direction of each of the pockets, each of the bar portions being continuous to the annular portions and recessed so that the middle portion in the axial direction thereof is made smaller in diameter than both-side portions in the axial direction thereof, wherein a connection radius R (radius of curvature) between an inner diameter side portion of a wall of the pocket and the annular portion has a relationship of $0.2<R/Dr\leq0.5$ with respect to the diameter Dr of the needle roller.

4. A supporting structure for a connecting rod of an engine, in which a major boss portion at one end of the connecting rod is fitted to a crank pin of a crank shaft via a bearing, and a minor boss portion at the other end of the connecting rod is fitted to a piston pin of a piston via a bearing, wherein at least one of the bearings for supporting the major boss portion and the minor boss portion of the connecting rod comprises, a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof, and a plurality of needle rollers retained in the pockets of the cage, and wherein a connection radius R (radius of curvature) between an inner diameter side portion of a wall of the pocket and the annular portion has a relationship of $0.2<R/Dr\leq0.5$ with respect to the diameter Dr of the needle roller.

5. A needle roller bearing comprising:

a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof; and a plurality of needle rollers retained in the pockets of the cage, wherein the annular portions protrude like flanges toward the inner diameter side in connection with the both-side portions of the bar portions, and wherein an inside surface of a protrudent portion of the annular portion protruding toward the inner diameter side is inclined inwardly of the bearing toward the outer diameter side.

6. A needle roller bearing as set forth in claim 5, wherein the needle roller bearing is used to support a connecting rod of an engine.

7. A cage for a needle roller bearing comprising:

pockets for retaining needle rollers formed at a plurality of portions in the circumferential direction thereof;

annular portions at both sides in the axial direction of the pockets; and bar portions at both sides in the circumferential direction of each of the pockets, each of the bar portions being continuous to the annular portions and recessed so that the middle portion in the axial direction thereof is made smaller in diameter than both-side portions in the axial direction thereof, wherein the annular portions protrude like flanges toward the inner diameter side in connection with the both-side portions of the bar portions, and wherein an inside surface of a protrudent portion of the annular portion protruding toward the inner diameter side is inclined inwardly of the bearing toward the outer diameter side.

8. A supporting structure for a connecting rod of an engine, in which a major boss portion at one end of the connecting rod is fitted to a crank pin of a crank shaft via a bearing, and a minor boss portion at the other end of the connecting rod is fitted to a piston pin of a piston via a bearing, wherein at least one of the bearings for supporting the major boss portion and the minor boss portion of the connecting rod comprises, a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof, and a plurality of needle rollers retained in the pockets of the cage, and wherein the annular portions protrude like flanges toward the inner diameter side in connection with the both-side portions of the bar portions, and wherein an inside surface of a protrudent portion of the annular portion protruding toward the inner diameter side is inclined inwardly of the bearing toward the outer diameter side.

9. A needle roller bearing comprising:

a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof; and a plurality of needle rollers retained in the pockets of the cage, wherein the annular portions protrude like flanges toward the inner diameter side in connection with the both-side portions of the bar portions, and wherein the inner diameter D1 of the annular portion has a relationship of $(D0+0.35Dr)\leq D1\leq(D0+0.45Dr)$, where the inscribed circle diameter of the needle rollers is D0 and the diameter of the needle roller is Dr.

10. A needle roller bearing as set forth in claim 9, wherein the needle roller bearing is used to support a connecting rod of an engine.

11. A cage for a needle roller bearing comprising:

pockets for retaining needle rollers formed at a plurality of portions in the circumferential direction thereof;

annular portions at both sides in the axial direction of the pockets; and bar portions at both sides in the circumferential direction of each of the pockets, each of the bar portions being continuous to the annular portions and recessed so that the middle portion in the axial direction thereof is made smaller in diameter than both-side portions in the axial direction thereof, wherein the annular portions protrude like flanges toward the inner diameter side in connection with the both-side portions of the bar portions, and wherein the inner diameter D1 of the annular portion has a relationship of $(D0+0.35Dr) \leq D1 \leq (D0+0.45Dr)$, where the inscribed circle diameter of the needle rollers is D0 and the diameter of the needle roller is Dr.

12. A supporting structure for a connecting rod of an engine, in which a major boss portion at one end of the connecting rod is fitted to a crank pin of a crank shaft via a bearing, and a minor boss portion at the other end of the connecting rod is fitted to a piston pin of a piston via a bearing, wherein at least one of the bearings for supporting the major boss portion and the minor boss portion of the connecting rod comprises, a cage having pockets formed at a plurality of portions in the circumferential direction, annular portions at both sides in the axial direction of the pockets, and bar portions at both sides in the circumferential direction of each of the pockets, each of the bar portions being continuous to the annular portions and recessed so that the middle portion in the axial direction thereof is made smaller in diameter than both-side portions in the axial direction thereof, and a plurality of needle rollers retained in the pockets of the cage, and wherein the annular portions protrude like flanges toward the inner diameter side in connection with the both-side portions of the bar portions, and wherein the inner diameter D1 of the annular portion has a relationship of $(D0+0.35Dr) \leq D1 \leq (D0+0.45Dr)$, where the inscribed circle diameter of the needle rollers is D0 and the diameter of the needle roller is Dr.

* * * * *